United States Patent [19]

Kobayashi et al.

[11] 4,317,633
[45] Mar. 2, 1982

[54] DEVICE FOR DETECTING THE SURFACE UNEVENNESS OF WIRE-SHAPED MATERIAL

[75] Inventors: Takashi Kobayashi; Etsurou Nitta, both of Osaka, Japan

[73] Assignee: Sumitomo Electric Industries, Ltd., Osaka, Japan

[21] Appl. No.: 139,528

[22] Filed: Apr. 11, 1980

[30] Foreign Application Priority Data

Oct. 12, 1979 [JP] Japan .................. 54-142002[U]
Oct. 12, 1979 [JP] Japan .................. 54-142003[U]

[51] Int. Cl.³ ............................................. G01N 21/84
[52] U.S. Cl. .................................. 356/371; 250/572; 356/430
[58] Field of Search ............... 356/371, 445, 429, 430, 356/237; 250/559, 562, 571, 572; 350/433

[56] References Cited

U.S. PATENT DOCUMENTS 3,877,814  4/1975  Hess et al. .................. 356/371
3,931,525  1/1976  Clarke ........................ 356/430
4,095,905  6/1978  Kuni et al. .................. 356/430

Primary Examiner—R. A. Rosenberger
Attorney, Agent, or Firm—Sughrue, Mion, Zinn, Macpeak and Seas

[57] ABSTRACT

A device for detecting surface unevenness by the utilization of reflected light of wires having a covering of light-transmissive insulating material such as enamel. Light is projected onto the wire-shaped material and is received therefrom by means of glass fibers. The incident angle of light applied to the insulating material is selected to be larger than the critical angle of the material. A rod lens is provided for each glass fiber in such a manner that the longitudinal axis of the rod lens is orthogonal to the longitudinal axis of the glass fiber. A light shielding board is disposed between the light projection side and the light receiving side so that only light reflected by the surface of the wire-shaped material is received whereby the surface unevenness of the insulating material layer is detected without being affected by scratches or defects on the wire conductor.

7 Claims, 11 Drawing Figures

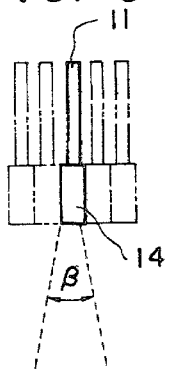
FIG. 6
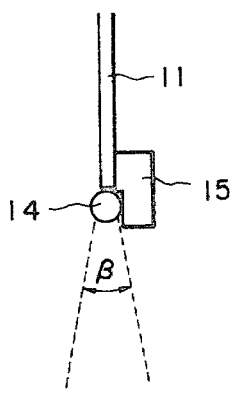
FIG. 7
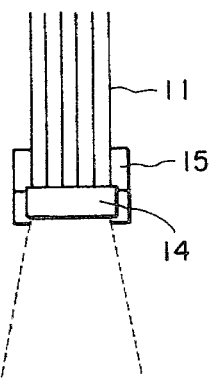
FIG. 8
FIG. 9A
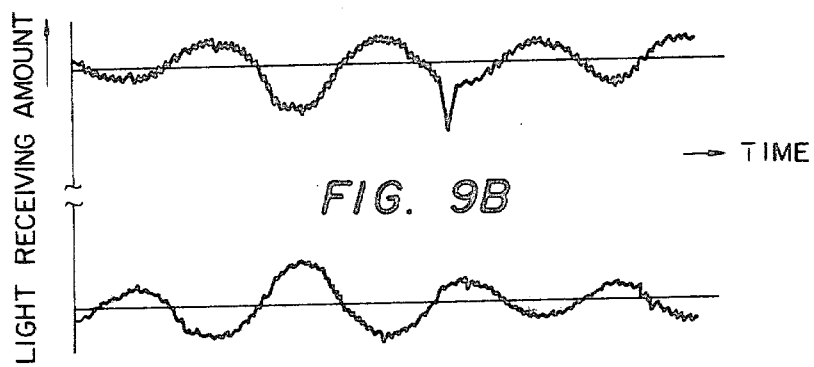
FIG. 9B
FIG. 9C

DEVICE FOR DETECTING THE SURFACE UNEVENNESS OF WIRE-SHAPED MATERIAL

BACKGROUND OF THE INVENTION

The invention relates to a device for detecting by the utilization of reflected light surface unevenness of a wire-shaped body which has a conductor covered with a light transmissive insulating material such as enamel. Such surface unevenness results primarily from raised portions such as may occur by the presence of particles.

In a typical device of this general type, light is shown upon such a wire-shaped body (hereinafter referred to merely as "a wire" when applicable) from obliquely above the wire and along the axial direction of the wire, with light reflected by the wire received on the opposite side of the wire. Raised portions on the surface of the wire are detected by utilizing the fact that the amount of light is diminished in the presence of raised portions. If the insulating material is transparent the light may pass through the insulating material layer and be reflected by the surface of the conductor. In that case, if the conductor has scratches on the surface, the light will be irregularly reflected with the result that the amount of light received is further diminished. Thus, not only raised portion on the insulating material layer but also scratches on the conductor surface are detected.

In general, raised portions which are formed on the insulating material layer by the presence of bubbles, dust or particles, are small while scratches formed on the surface of the conductor tend to be significantly larger. In view of this, a detecting technique was previously employed which utilized a geometrical differential system in which scratches and raised portions are discriminated from each other according to geometrical dimensional differences therebetween. Another earlier detecting technique utilized a time differential system in which dimensional differences were replaced by time differences.

However, scratches are not always formed on the conductor in the axial direction thereof. That is, scratches may also be formed in the circumferential direction. In such a case, the above-described conventional techniques cannot distinguish scratches on the conductor from raised portions on the insulating material layer.

SUMMARY OF THE INVENTION

Accordingly, an object of the present invention is to provide a surface unevenness detecting device in which, for detecting raised portions on the surface of a wire-shaped body having a conductor covered with an insulating material layer, only raised portions formed on the insulating material layer are detected, and the results of the detecting operation are not affected by scratches on the surface of the conductor.

Another object of the invention is to provide a surface unevenness detecting device having a sensor in which a rod lens for decreasing the divergent angle of light emitted from a glass fiber is provided in such a manner that the axis of the rod lens is orthogonal to the longitudinal axis of the glass fiber.

The foregoing and other objects as well as the characteristic features and advantages of the invention will become more apparent from the following detailed description when read in conjunction with the accompanying drawings. While preferred embodiments of the invention are described, it should be noted that the invention is not limited thereto or thereby.

BRIEF DESCRIPTION OF THE DRAWINGS

In the accompanying drawings:

FIGS. 5 and 6 are front views showing examples of a conventional glass fiber sensor;

FIG. 7 is a side view of a preferred embodiment of a glass fiber sensor according to the invention;

FIG. 8 is a front view of the glass fiber in FIG. 7; and

FIGS. 9A-9C are diagrams showing waveforms detected by the device according to the invention.

DESCRIPTION OF THE PREFERRED EMBODIMENTS

Figure 1:
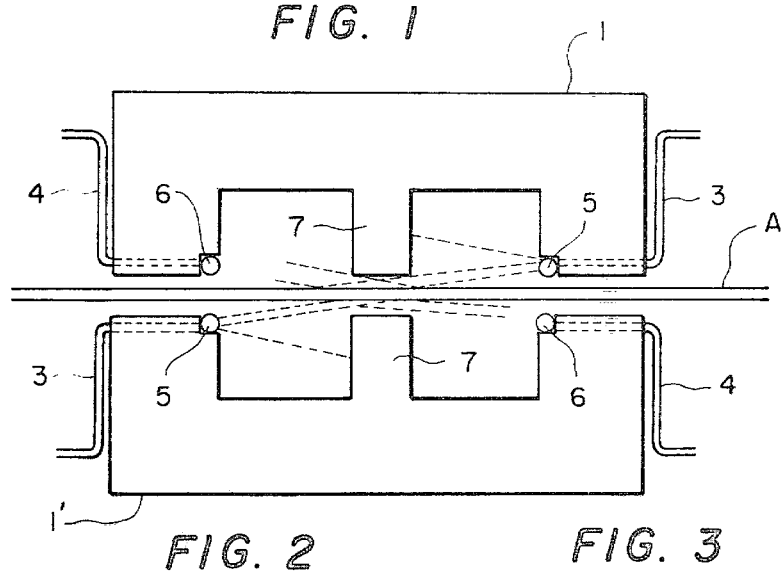
FIGS. 1 and 2 are respectively front and side views of a preferred embodiment of a device for detecting surface unevenness of a wire-shaped body.
Figure 2:
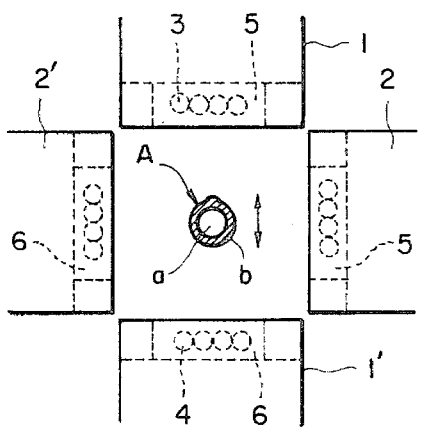

A wire-shaped body to be inspected, as shown in FIGS. 1 and 2, is constructed of a light-transmissive insulating cover layer b formed upon a conductor a. Four detecting heads 1, 1', 2 and 2' are arranged above, below, and to the right and left of the wire A, respectively, as shown in FIG. 2. Each detecting head has an E shape in the axial direction of wire. For the head 1, a light projecting glass fiber 3 and a light receiving glass fiber 4 are provided on the right and left sides thereof, as viewed in FIG. 1. At the ends of the glass fibers 3 and 4, light projecting and receiving cylindrical lenses 5 and 6 are provided laterally of the wire such that the longitudinal axes of the lenses 5 and 6 are orthogonal to the wire. The end faces of the lenses 5 and 6 are exposed inside of the detecting head 1. Similarly, in the detecting head 1', light projecting and receiving glass fibers 3 and 4 are provided symmetrically with the aforementioned glass fibers 3 and 4, and cylindrical lenses 5 and 6 are provided at the ends of the glass fibers 3 and 4 the same as for the glass fibers of the detecting head 1. However, it should be noted that the positions of the glass fibers 3 and 4 of the detecting head are reversed with respect to the glass fibers 3 and 4 of the detecting head 1'. This arrangement prevents light emitted by the detecting head 1 from being received in the detecting head 1'.

Similarly as for the detecting heads 1 and 1', glass fibers and lenses are provided in the detecting heads 2 and 2'.

Light emitted from the light projecting lens 5 tends to diffuse somewhat and, accordingly, a part of the light reflected by the surface of the wire A is received by the light receiving lens 6. A shielding board 7 is provided between the light projection side and the light receiving side of each detecting head in order to block light which would otherwise be received directly by the light receiving lens without being reflected by the surface of the wire A.

Figure 3:
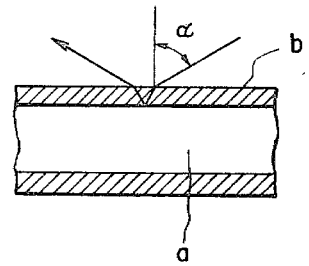
FIGS. 3 and 4 are enlarged sectional views showing a portion of a wire-shaped body utilized with a description of light applied thereto.

In the case where, as shown in FIG. 3, the incident angle $\alpha$ of projected light is smaller than the critical angle of the light-transmissive insulating material forming the insulating cover layer b, the projected light is refracted when entering the insulating cover layer b and is then reflected by the surface of the conductor a again passing through the insulating cover layer before being received. If the surface of the conductor a has a scratch, then the light will be reflected irregularly therefrom as a result of which the amount of light received is accordingly diminished making it possible to detect the presence of the scratch.

Figure 4:
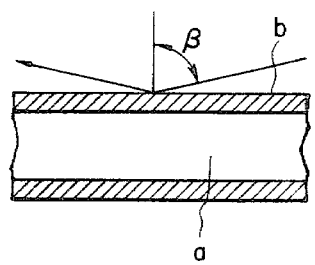

In view of the foregoing, in accordance with the present invention, the position and direction of the projecting lens is so selected that the incident angle $\beta$ of projected light is larger than the critical angle of the insulating material as shown in FIG. 4. For example, if the critical angle is 78°, the incident angle $\beta$ is preferably selected to be about 80°.

With the incident angle of projected light selected as described above, the projected light is totally reflected by the surface of the insulating cover layer b. Therefore, only raised portions of the surface are detected. That is, the detecting operation is not affected by the presence of scratches on the surface of the conductor.

Figure 5:
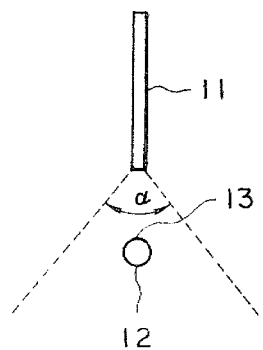

The longitudinal axes of the cylindrical lenses 5 and 6 are orthogonal to the glass fibers as shown in FIG. 1. The reason for this is as follows. As shown in FIG. 5, light emitted from the end of a glass fiber 11 has a divergent angle of about 70 to 80 degrees. In a detector device in which light is applied to a material 12 in a manner as described above and in which the reflected light is received and processed for detecting an abnormal raised portion 13 on a wire body 12, the distance between the wire body 12 and the end face of the glass fiber 11 should be within about 5 mm for satisfactory detection sensitivity. If the distance is more than that, the detection sensitivity is undesirably decreased. For this purpose, a rod lens 14 is provided on the end face of the glass fiber 11 for decreasing the divergent angle of the light. In this case, the divergent angle $\beta$ can be decreased to about 20° as a result of which, even if the distance between the wire body and the lens is increased to about 20 mm, satisfactory detection sensitivity is nonetheless provided.

Previously, a rod lens for decreasing the divergent angle of light emitted from a glass fiber was provided on the glass fiber in such a manner that the longitudinal axis of the rod lens lay along the longitudinal axis of the glass fiber 11. However, the inventors have found that, when the rod lens is provided on the glass fiber in such a manner that the longitudinal axis of the rod lens is orthogonal to the longitudinal axis of the glass fiber as shown in FIGS. 7 or 8, diffusion of light from the glass fiber can be limited similar to the earlier structure.

In this case, it is not always necessary that the rod lens 14 be integral with the end face of the glass fiber 11. That is, a technique may be successfully employed in which an end portion of the glass fiber 11 is fixedly secured to a holder 15 and the rod lens 14 is positioned laterally or perpendicularly with respect to the longitudinal axis of the glass fiber with a very short gap left between the rod lens and the end face of the glass fiber.

A glass fiber sensor according to the invention is constructed as described above. Heretofore, where plural glass fibers were used for the detection operation, one rod lens had to be provided for each glass fiber. However, in accordance with the present invention, a single rod lens can be provided commonly for plural glass fibers. Thus, a glass fiber sensor of the invention is undoubtedly more economical then a conventional glass fiber sensor.

Furthermore, if, in a conventional glass fiber sensor, the diameter of the glass fibers were to be different from that of the corresponding rod lenses, then gaps had necessarily to be provided between the glass fibers as shown in FIG. 6. On the other hand, in a glass fiber sensor according to the invention, the glass fibers can be arranged close to one another so that no such wasted space need be provided.

In the above-described embodiment of the invention, glass fibers are used for light projection and light reception. However, the detecting device according to the invention may be so modified that a light projecting section is formed by providing light sources for the detecting heads 1, 1', 2 and 2' in which the incident angle of light to the insulating cover layer b is set to be larger than the critical angle and a light receiving section is provided using, for instance, photoelectric cells on the light receiving side for receiving the reflected light. In addition, if the detecting device is so modified that the projected light is focused by an optical system, then the light shielding board 7 may be eliminated.

In some applications, the above-described detection system may be affected by vibration which accompanies the movement of the wire A. However, this difficulty can be eliminated by employing the following technique. The detecting head 1, 1', 2 and 2' are positioned above, below, to the right and to the left of the wire to be inspected as before as shown in FIG. 2. However, the amounts of light received by the opposed detecting heads 1 and 1' or 2 and 2' are processed by addition.

This will be described in more detail. The pair of detecting heads 1 and 1' disposed above and below the wire A will be considered. When the wire vibrates vertically as indicated by the arrow in FIG. 2, the amount of light received by one of the detecting heads toward which the wire A is moved decreases while the amount of light received by the other detecting head increases. As indicated in FIGS. 9A and 9B, which are graphical representations showing variations in the amount of light received by the two detecting heads with lapse of time, the phase difference between the variations is 180°. Therefore, by adding the amounts of light received by the two detecting heads, variations in the amounts of light attributed to vibration of the wire cancel each other as shown in FIG. 9C as a result of which only variations in the amount of light attributed to the unevenness of the surface of the wire A are of any significance. This, unevenness of the surface of the wire can be accurately detected even when the wire is vibrating.

What is claimed is:

1. A device for detecting the surface unevenness of a wire-shaped body which is covered with an insulating material comprising: at least one light projecting section and at least one light receiving section arranged along said wire-shaped body in such a manner that an incident angle of light projected by each said light projecting section onto said insulating material is larger than the critical angle thereof, each said light projecting section and each said light receiving section comprising a glass fiber sensor having a rod lens and at least one glass fiber, said rod lens having a longitudinal axis disposed orthogonal to the longitudinal axis of said at least one glass fiber.

2. The device as claimed in claim 1 wherein a gap is provided between said at least one glass fiber and said rod lens.

3. The device as claimed in claim 1 further comprising means for focusing said projected light.

4. The device as claimed in claim 1 further comprising a light shielding board disposed between each said light projecting section and said light receiving station.

5. The device as claimed in claim 1 wherein said light projecting sections and light receiving sections are plural in number and are arranged in pairs in detecting head sections disposed around said wire-shaped body wherein the directions of projected light of said detecting heads disposed on opposite sides of said wire-shaped body are opposite to one another.

6. The device as claimed in claim 1 wherein light projecting sections and light receiving sections are plural in number and arranged in pairs in detecting head sections disposed around said wire-shaped body and further comprising means for adding signals produced by light receiving sections disposed on opposite sides of said wire-shaped bodies.

7. The device as claimed in claim 1 wherein each glass fiber sensor comprises a plurality of glass fibers, said glass fibers in each sensor being aligned next to each other so that one end of each glass fiber faces and is next to said glass fiber sensor rod lens.

* * * * *